United States Patent [19] [11] 4,128,850
Fischer, II [45] Dec. 5, 1978

[54] METHOD AND APPARATUS FOR TRANSMITTING FACSIMILES OVER TELEPHONE LINES

[75] Inventor: Frederic P. Fischer, II, Williamsville, N.Y.

[73] Assignee: Calspan Corporation, Buffalo, N.Y.

[21] Appl. No.: 797,092

[22] Filed: May 16, 1977

[51] Int. Cl.² .............................................. H04N 1/40
[52] U.S. Cl. .................................... 358/284; 358/294
[58] Field of Search ...................... 358/294, 280, 284

[56] References Cited
U.S. PATENT DOCUMENTS 3,775,559  11/1973  Vieri ...................................... 358/294
3,993,888  11/1976  Fellman ........................ 340/146.3 E Primary Examiner—Howard W. Britton
Attorney, Agent, or Firm—Allen J. Jaffe; David J. Zobkiw

[57] ABSTRACT

The quality of and/or transmission speed for fingerprint facsimiles transmitted over telephone lines are improved by image enhancement prior to transmission. Image enhancement is achieved by using a multi-element photodetector array and simultaneously processing the signals from the component elements of the multi-element photodetector to produce a binary video output indicating whether the center of the scan is on a ridge or a valley portion of the fingerprint.

3 Claims, 4 Drawing Figures

METHOD AND APPARATUS FOR TRANSMITTING FACSIMILES OVER TELEPHONE LINES

There are a number of types of data/information that are transmitted by facsimile machines over telephone lines or the like. The types of data/information vary from textual material to line drawings to photographs. Each type of data/information has its requirements which are superimposed on the facsimile equipment in terms of required fidelity, operating speed, etc. Since telephone lines are a common transmission media, slow operating speeds translate into a large fee per transmission. Bandwidth compression techniques have been applied and are successful with many types of data.

Fingerprints, however, present unique problems. The person being fingerprinted is often uncooperative and causes the smudging of the fingerprints. Over inking and underinking as well as perspiration due to alcohol all contribute to the degradation of the image which may be further degraded by cuts, scars, new skin, etc. These difficulties notwithstanding, facsimile machines have been used for a number of years to transmit copies of fingerprint cards between law enforcement agencies via the dial-up telephone network or leased land lines. Existing facsimile equipment suitable for such a use, however, requires a relatively long transmission time in order to obtain classifiable fingerprint images. The amount of image degradation introduced by the facsimile system is a function of the original image quality and, therefore, poor quality prints suffer much more in terms of classifiability than do good quality prints. Image degradation is further increased by the transmission line interference when grey scale transmissions are used.

The requirement of a classifiable fingerprint facsimile is a result of a need for human verification of a fingerprint match. While computer based systems can directly "read" a fingerprint from a human finger as well as an inked impression from a card and can compare the fingerprint(s) with a file of fingerprints, processing constraints such as the cost and amount of available computer time produce a compromised system which identifies close matches. Thus a received facsimile having sufficient minutiae locations for computer processing may be of too poor of a quality for human verification.

Since it is necessary to have a classifiable facsimile, image processing techniques can be most efficiently used at the transmission point since that is the location of the best available data. Additionally, since a fingerprint is ideally made up of only ridges and valleys, binary signals provide the necessary information while avoiding the inherent errors resulting from the superimposing of line noise on grey scale information.

It is an object of this invention to reduce the amount of information necessary to be transmitted by a facsimile machine to permit the use of a lower bandwidth line and/or to speed transmission.

It is a further object of this invention to enhance the ridge-valley image of a fingerprint prior to transmission via a facsimile machine.

It is an additional object of this invention to offset the image degradation caused by lack of resolution and line noise.

It is a still further object of this invention to provide classifiable facsimiles from poor quality originals. These objects, and others as will become apparent hereinafter, are accomplished by the present invention.

In the present invention image enhancement is incorporated into the facsimile transmission equipment by employing a multi-element detector array in the transmitter. The outputs of the component elements of the multi-element array are combined to produce a binary output which is an enhanced representation of the center point of the area being scanned. If desired, the binary output can then be processed by conventional bandwidth compression techniques to reduce the transmission time.

BRIEF DESCRIPTION OF THE DRAWINGS

For a fuller understanding of the present invention, reference should now be had to the following detailed description thereof taken in conjunction with the accompanying drawings wherein.

Figure 1:
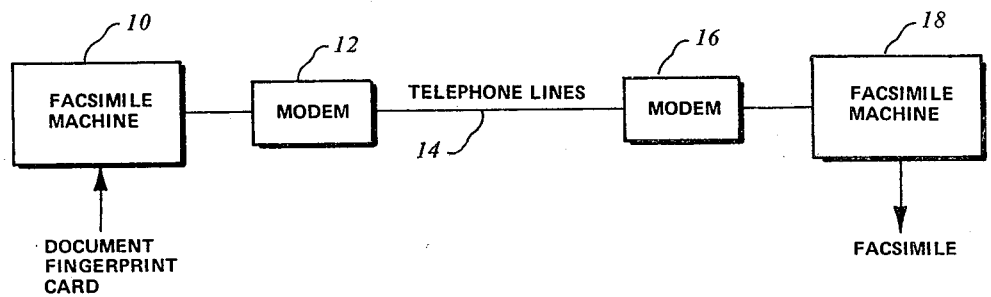
FIG. 1 is a block diagram of a general method of fingerprint facsimile transmission via telephone lines.

The general operation of a facsimile transmission system can best be understood with reference to FIG. 1. Facsimile machines 10 and 18 are similar, and often identical, with each being capable of both transmitting and receiving facsimiles. The facsimile machines 10 and 18 are connected with each other via modems 12 and 16 and dial-up or leased telephone lines 14. As illustrated, facsimile machine 10 is functioning as a transmitter and facsimile machine 18 is functioning as a receiver. A document fingerprint card is scanned by facsimile machine 10 which produces an output signal which is converted by modem 12 to a form suitable for transmission via telephone lines 14. Modem 16 acts on the received signal and reconverts and supplies the signal to facsimile machine 18 which is synchronized with facsimile machine 10. When acting as a receiver, the facsimile machine 18, rather than sensing light, creates an image, the facsimile, by exposing a photographic paper, by heating heat sensitive paper with a small wire or in some other conventional manner.

Figure 2:
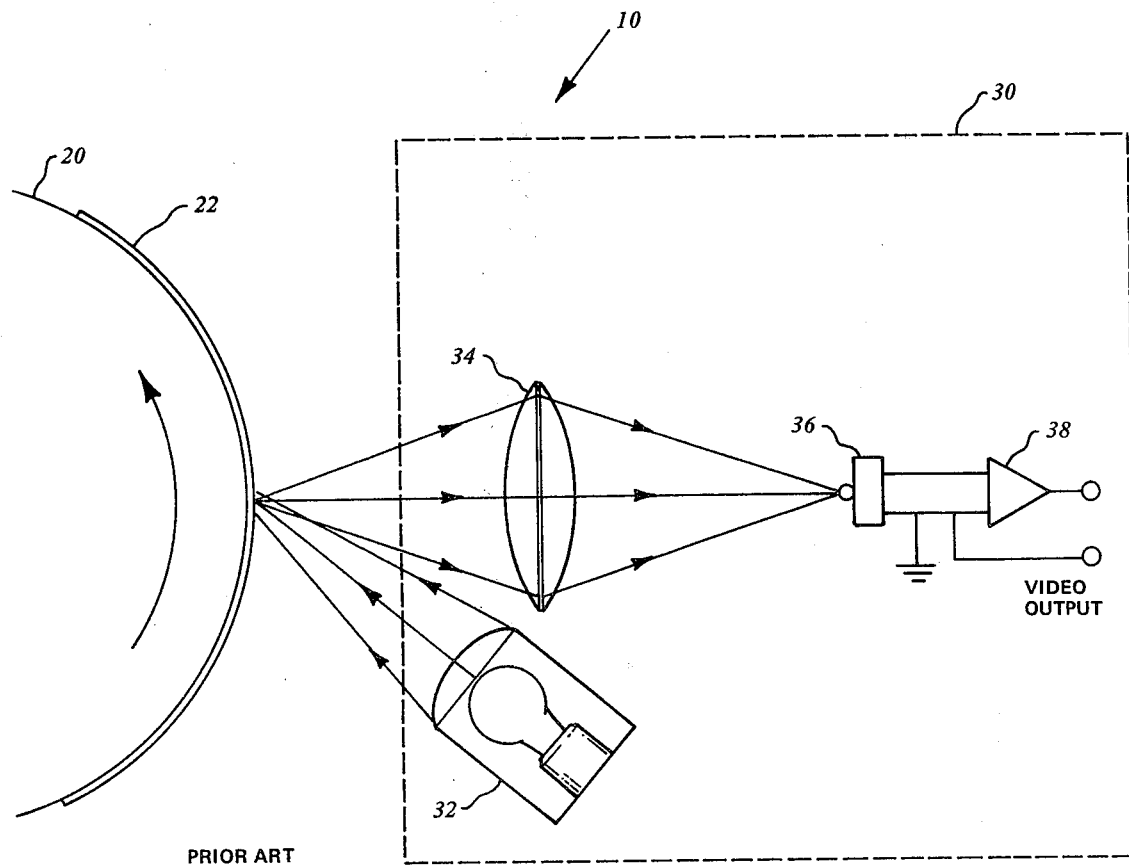
FIG. 2 is a schematic representation of the prior art reflectance sensing system.
Figure 3:
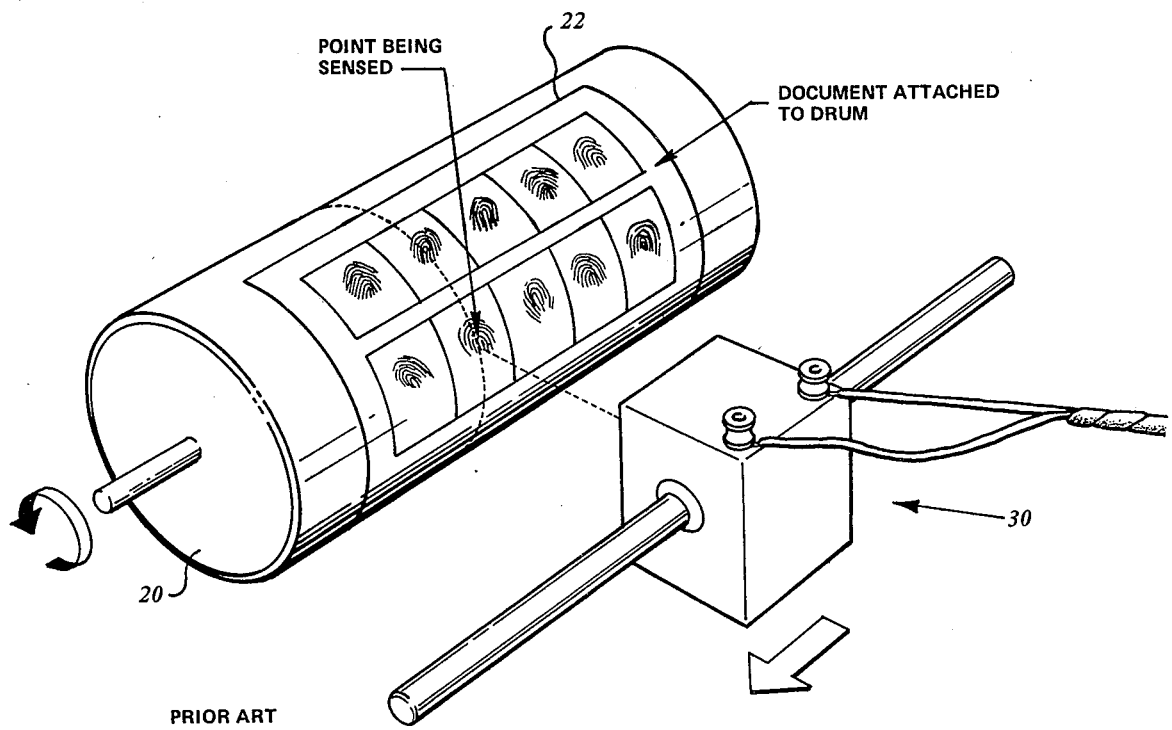
FIG. 3 is a pictorial representation of the essence of prior art facsimile equipment.

As best shown in FIG. 2, a document fingerprint card 22 is secured to the drum 20 of facsimile machine 10. The drum 20 which is nominally 11 inches long and 8½ inches in circumference is rotated at a nominal speed of 3 revolutions per second by a motor (not shown). The reflectance sensing system which is generally indicated by the numeral 30 is, as best shown in FIG. 3, mounted for movement parallel to the axis of rotation of the drum 20 and moves on the track at a rate of about 1 inch per 100 revolutions of the drum 20. The reflectance sensing system 30 includes a light source 32 which is focused on a point on the surface of drum 20 and covers the surface area of the drum 20 and thereby the fingerprint card 22 in a helix. Incident light from light source 32 striking the sample point on the document fingerprint card 22 is reflected through lens system 34 onto single-element photodetector 36. The photodetector 36 determines the grey scale value of the sample point and produces a signal which is amplified by amplifier 38 and supplied as a video output to modem 12 for transmission via telephone lines 14 and modem 16 to facsimile machine 18.

Due to such factors as uneven inking and finger pressure and smeared fingerprints the grey scale value output signal of facsimile machine 10 will contain a significant amount of information which can be significantly influenced by the superimposing of line noise on the output signal. Where there is a binary output these factors will also tend to produce false readings of smeared areas, etc. As a result, poor original fingerprints may deteriorate in facsimile transmission to produce a facsimile which is of too poor of a quality to use.

DESCRIPTION OF THE PREFERRED EMBODIMENT

Figure 4:
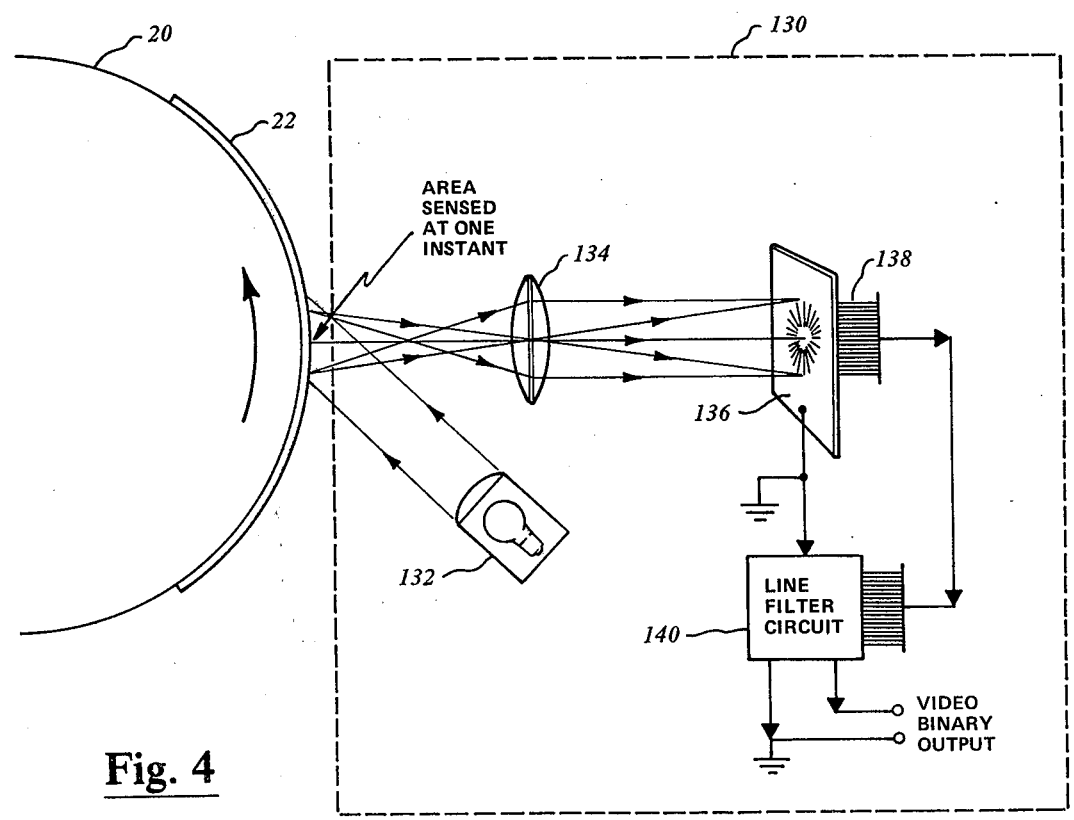
FIG. 4 is a schematic representation of the reflectance sensing system of the present invention.

The improved reflectance sensing system of the present invention is illustrated schematically in FIG. 4 and is generally designated by the numeral 130. Reflectance sensing system 130 includes light source 132 which is focused on an area on the surface of the drum 20 and moves axially with respect to drum 20, and thereby document fingerprint card 22, in the manner illustrated in FIG. 3. Incident light from light source 132 striking the sample area on the document fingerprint card 22 is reflected through lens system 134 onto photodetector array 136. The photodetector array 136 preferably takes the form of a central photodetector surrounded by pairs of radially extending photodetectors as illustrated in FIG. 1 of commonly assigned U.S. Pat. No. 3,993,888. The output of each element of the photodetector array 136 is communicated via individual leads 138 to line filter circuit 140. A suitable line filter circuit arrangement is shown in FIG. 2 of U.S. Pat. No. 3,993,888 which is hereby incorporated by reference. Line filter circuit 140 processes the photodetector array element outputs supplied via leads 138 to determine whether the central photodetector of photodetector array 136 is on a ridge or a valley and gives a video binary output representative of this determination. Since the entire area of photodetector array 136 is used to determine whether the central element of the array is located on a ridge or valley, the effects of poor fingerprint images are minimized since local voids can be filled in, smeared prints can be sharpened, etc. In addition since a binary output is produced, line noise is insufficient to prevent resolving the received signal into a duplicate of the transmitted binary signal. Thus a cleaner and brighter image is produced with no grey level. The use of the present invention thus affords a number of choices that were not previously available. The facsimile quality can be improved for the same transmission speed, the transmission speed can be increased for the same quality facsimile or a compromise between increased speed and quality can be made. Also, bandwidth compression techniques can be applied to the output signals and the use of binary output permits additional choices of encoding such as phase encoding and tone encoding.

Although a preferred embodiment of the present invention has been illustrated and described, other changes will occur to those skilled in the art. For example, a flying spot scanner or TV type scanner may be used. Also, the specific arrangement will be dictated by the nature of the system being adapted. It is therefore intended that the scope of the present invention is to be limited only by the scope of the appended claims.

I claim:

1. A method for improving the quality of facsimiles of fingerprints received at remote locations via telephone lines or the like including the steps of:

scanning overlapping areas of a fingerprint;
generating a plurality of signals for each area scanned, with each of the signals representing a portion of the area being scanned;
processing the plurality of signals generated for each area scanned to determine whether the area scanned is centered on a ridge or a valley;
producing a single enhanced binary signal representing the presence of either a ridge or a valley at the center of each area scanned;
transmitting the single enhanced binary signal produced for each area scanned;
receiving the transmitted signals; and
processing the received signals to produce a facsimile of the fingerprint.

2. The method of claim 1 wherein the step of processing the plurality of signals generated for each area scanned includes the step of enhancing the signal representing the central portion of each area scanned by comparing the signals representing the surrounding area.

3. In a facsimile transmission system including at least two facsimile machines connected via telephone lines or the like the improvement comprising:

means for scanning overlapping areas of a fingerprint and for producing a plurality of signals representing portions of each area scanned;
means for processing the plurality of signals representing portions of each area scanned to produce a single enhanced binary signal representing the presence of either a ridge or a valley at the center of each area scanned;
means for transmitting the single enhanced binary signal produced for each area scanned;
means for receiving the transmitted signals; and
means for processing the received signals to produce a facsimile of the fingerprint.

* * * * *